No. 773,870. PATENTED NOV. 1, 1904.
F. S. HOLMES.
AUTOMATIC ELECTRICAL SIGNALING SYSTEM.
APPLICATION FILED MAR. 25, 1904.
NO MODEL. 4 SHEETS—SHEET 3.
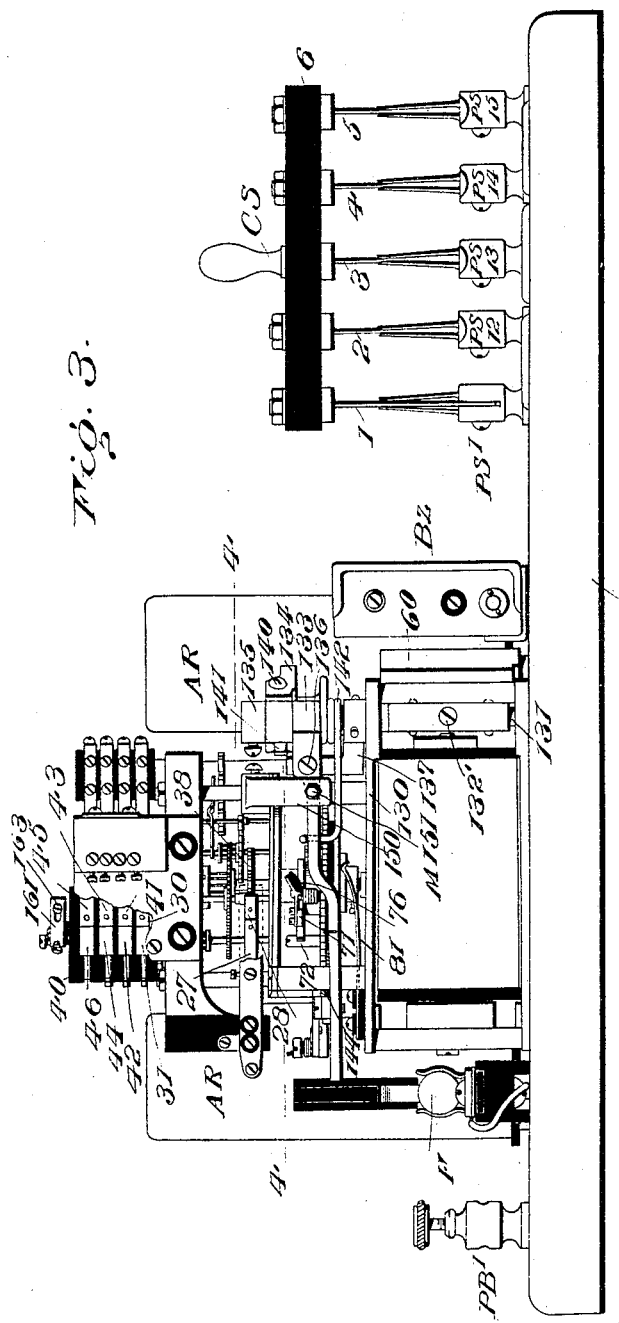
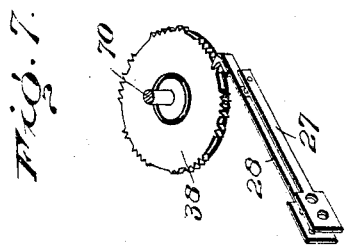
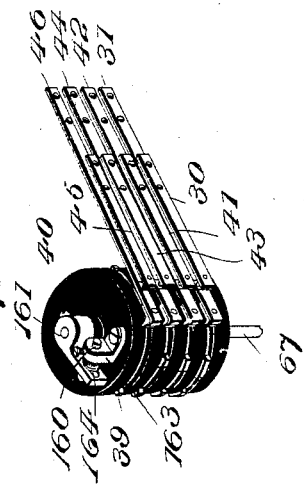
Witnesses
U. A. Williams
W. B. Ketham
Inventor
Franklin S. Holmes,
By Mauro, Cameron, Lewis & Massie
Attorneys.

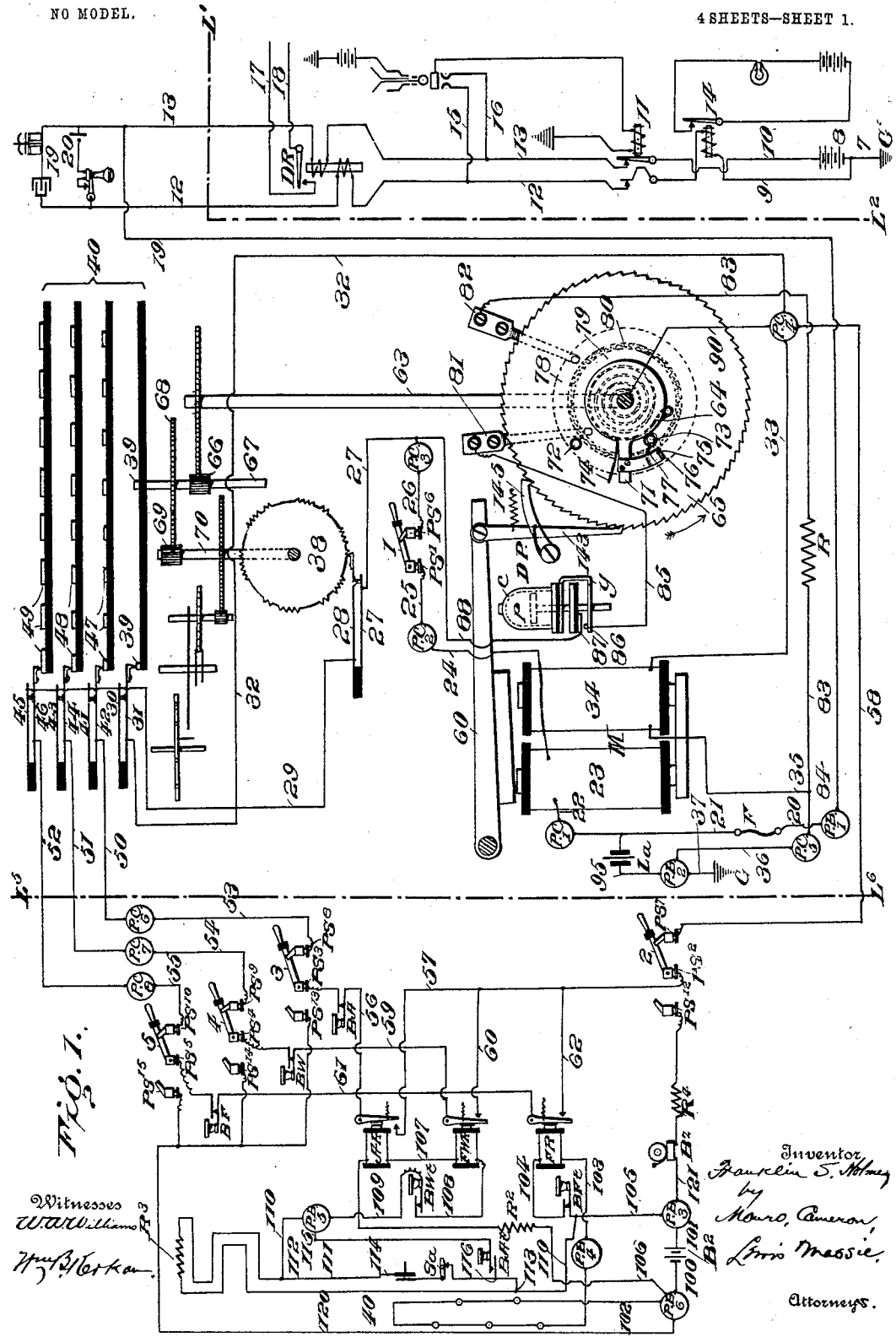

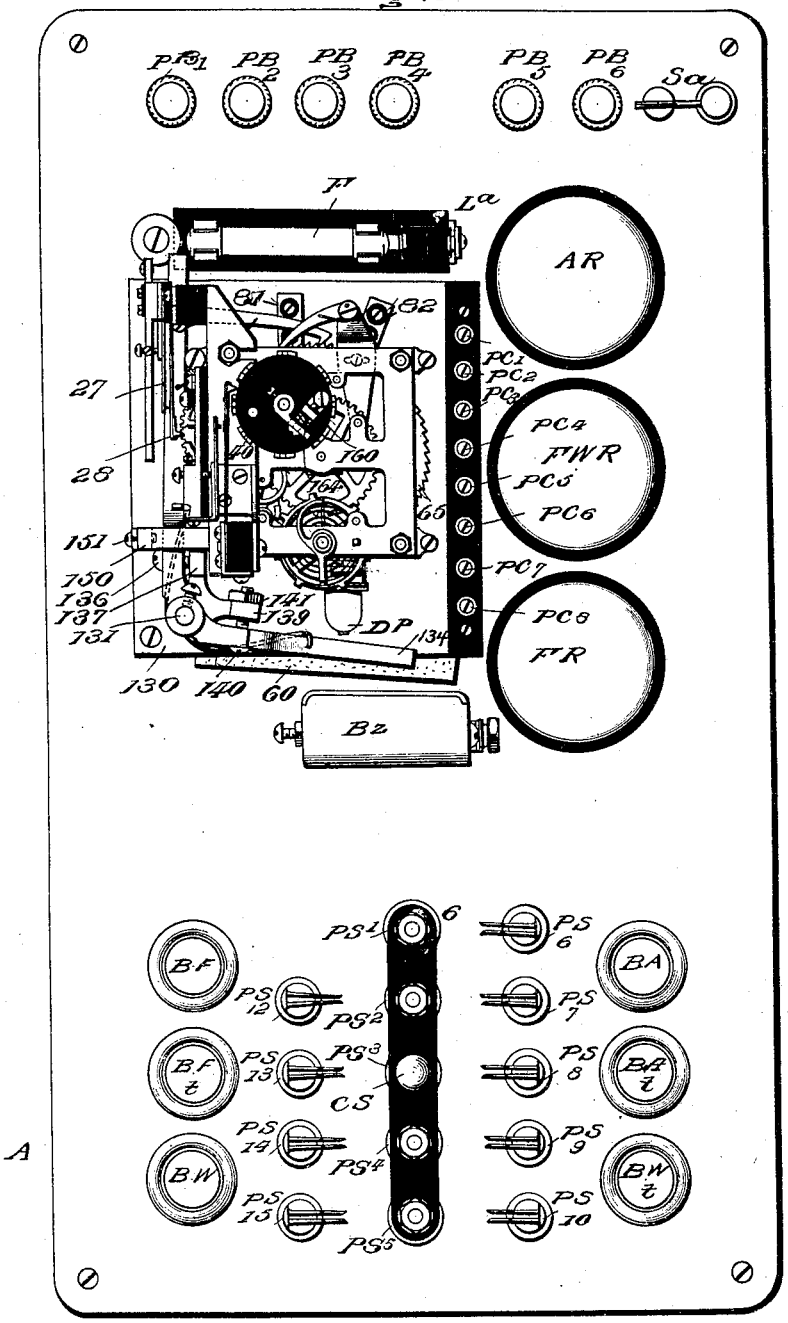

No. 773,870. PATENTED NOV. 1, 1904.
F. S. HOLMES.
AUTOMATIC ELECTRICAL SIGNALING SYSTEM.
APPLICATION FILED MAR. 25, 1904.
NO MODEL. 4 SHEETS—SHEET 4.
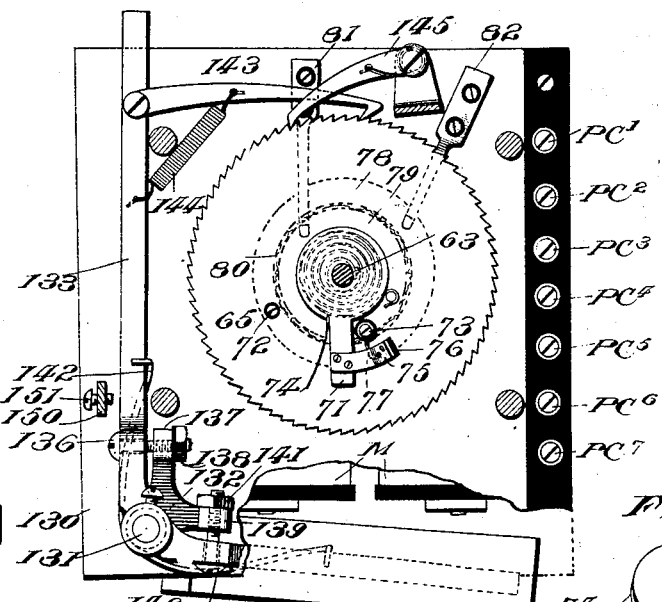
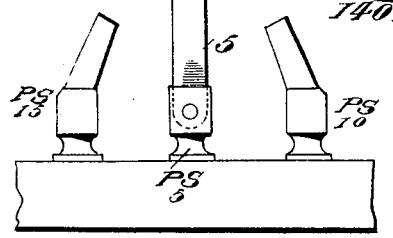
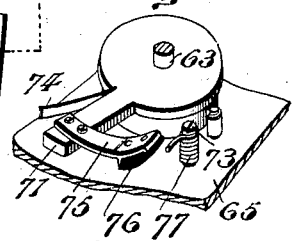
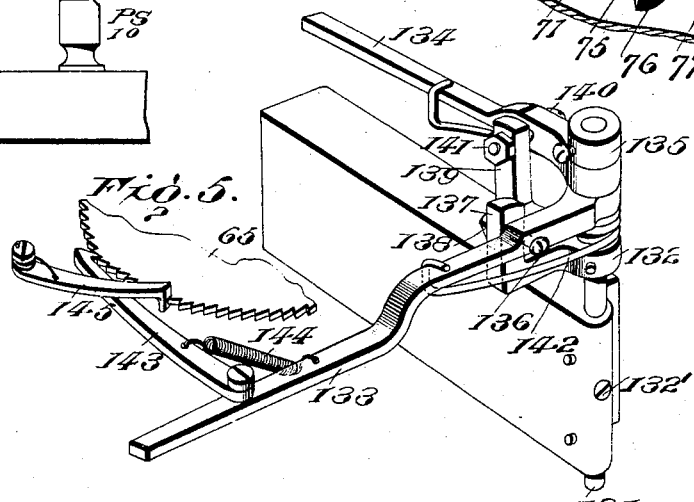
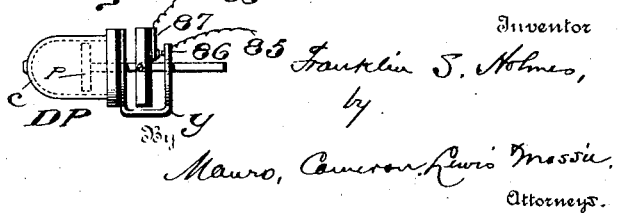
Witnesses
W. A. Williams
Wm. B. Kerkam
Inventor
Franklin S. Holmes,
by
Mauro, Cameron, Lewis & Massie
Attorneys No. 773,870. Patented November 1, 1904.

UNITED STATES PATENT OFFICE.

FRANKLIN S. HOLMES, OF NEW YORK, N. Y.

AUTOMATIC ELECTRICAL SIGNALING SYSTEM.

SPECIFICATION forming part of Letters Patent No. 773,870, dated November 1, 1904.

Application filed March 25, 1904. Serial No. 200,013. (No model.)

*To all whom it may concern:*

Be it known that I, FRANKLIN S. HOLMES, of New York, State of New York, have invented a new and useful Automatic Electrical Signaling System, which invention is fully set forth in the following specification.

This invention relates to signal-transmitting mechanism and circuits particularly adapted for use in association with fire-alarm, burglar-alarm, and analogous protection-circuits for sending to a central station or protection-office signals indicative of the conditions at the protected structure. Furthermore, it is particularly adapted to the utilization of a circuit also used for other purposes—a telephone-circuit, for example—as the connecting medium between the protected structure and the central office without in any way interfering with the operation of said circuit for its primary purpose. The signals are in the form of electrical impulses produced in suitable manner, preferably (and as herein shown) by making and breaking the signaling-circuit. As applied, for example, in conjunction with a central-battery metallic-circuit telephone-line, said battery being utilized to supply the signaling-current, the signaling-circuit may lead from ground at the substation through the signal-transmitting mechanism and by way of one conductor only of the telephone-line through the central battery to ground at the central office. In addition to the usual telephone equipment two coils of a differentially-wound relay are included in the two line conductors of the telephone-circuit at the central office. The magnetizing effect produced by the usual telephone-current passing through one coil will be neutralized by the opposing effect produced by the passage of the current through the other coil in the opposite direction; but a current impulse passing over the signaling-circuit through only one of said coils will energize the relay, causing it to attract its armature to close a local circuit, and thereby actuate appropriate signal-receiving mechanism at the protection-office—such, for example, as described in my applications, Serial No. 152,953, filed April 16, 1903, and Serial No. 198,952, filed March 19, 1904. The signal-circuit comprises means for regularly closing the circuit to periodically send a connection-signal—say one every four minutes—to indicate to the attendant at the protection-office that the system is in normal working order. Means are provided whereby in case of disturbance in any one of the protection-circuits the main signal-circuit will be closed to send alarm-signals more frequently—say once each minute. By making up the alarm-signals sent under different conditions of different combinations of impulses the central-office attendant may be advised of the exact nature of a disturbance at the protected structure. I preferably employ rotating elements for making and breaking the signaling-circuit. These elements may be rotated by any suitable motor, such as a spring-motor wound by hand. I prefer, however, to employ means for automatically winding the motor by the signal impulses. In this connection my invention also comprises means for preventing the winding means from operating when the motor is fully wound. Means are also provided for causing the automatic winding means to promptly operate when the system is connected up for operation after a period of disuse.

My invention also comprises other important novel features, all of which will be fully understood from the detailed description in connection with the accompanying drawings, showing one embodiment of the invention.

Figure 1 is a diagrammatic view of a system embodying the invention. Fig. 2 is a front elevation, and Fig. 3 a side elevation from the left of Fig. 2, of the mechanism at the protected structure in practical form. Fig. 4 is a horizontal section on broken line 4' 4' of Fig. 3. Fig. 5 is a perspective of the armature and its connections. Figs. 6, 7, 8, and 10 are details. Fig. 9 is an end view of the switch.

Referring first to Figs. 2 and 3, A is a board or base upon which the apparatus of the system is mounted and to and from which all of the circuit connections lead. At the top of the board are six binding-posts (posts on board) $PB'$ $PB^2$ $PB^3$ $PB^4$ $PB^5$ $PB^6$ and switch $Sa$. On the spring-motor mechanism—ordinary clockworks have been found to be suitable for the purpose—there are eight binding-posts (posts on clock) PC' to PC⁸. At the lower end of the board there are six push-buttons BF, BF$t$, BW, BA, BA$t$, and BW$t$, arranged in two rows, adapted for use in testing the system, as herein described. Between the rows of push-buttons there are fourteen posts of a compound switch CS, arranged in three rows, as follows, Figs. 2 and 9: left-hand row, posts of switch PS¹² PS¹³ PS¹⁴ PS¹⁵; right-hand row, PS⁶, PS⁷, PS⁸, PS⁹, and PS¹⁰; intermediate row, PS', PS², PS³, PS⁴, and PS⁵. Five switch-blades 1, 2, 3, 4, and 5 are pivoted to the posts of the intermediate row, respectively, and connected together at their outer ends by a bar of insulation 6. When thrown into engagement with the right-hand row of switch-posts, (or "on protection,") the switch makes all of the necessary connections between the parts of the system at the protected structure or substation and with the line leading to the central station or protection-office. Under these conditions the regular signals indicating normal conditions or irregular signals indicating disturbance may be sent from the protected structure to the central protection-office. To throw the system completely out of operation, the switch is moved to the intermediate position, in which it is shown in Figs. 2 and 3. This dissociates the protective wiring and apparatus at the protected structure from the signal-sending mechanism and also disconnects the latter from the line to the protection-office. These conditions also prevail when the switch is thrown into engagement with the left-hand row of switch-posts, ("on test,") with the addition that local test conditions are thereby established. AR, FWR, and FR are three relays connected in the local circuits of the protected structure. These preliminary references to the binding-posts, switches, push-buttons, and relays will facilitate an understanding of the circuits traced through these parts.

Referring now particularly to Fig. 1, (but also to the other figures of the drawings for illustration of the electrical devices in commercial form,) the circuit connections and apparatus at the telephone central office are shown at the right of the line L' L², while the mechanism at the substation or protected structure is shown at the left of said line. The line L⁵ L⁶ separates the protective wiring at the left from the signal-sending mechanism at the right of said line.

The main battery 8 at the central office of a metallic-circuit telephone-line is connected to ground G' by a conductor 7. From the opposite poles of this battery conductors 9 and 10 lead to contacts of an operator's cut-out relay 11, and conductors 12 and 13 lead from contacts of said relay to the telephone outfit at the subscriber's station. The coil of a signal-lamp relay 14 is connected in conductor 9, and branch conductors 15 and 16 lead from conductors 12 and 13 to the usual plug-socket at the telephone-exchange switchboard. Said conductors 12 and 13 also contain the coils, respectively, of a differentially-wound relay DR, the armature of which serves to make and break a local circuit leading by conductors 17 and 18 to signal-receiving mechanism (not shown) at the central protection-office. Receiving mechanism suitable for this purpose and preferable for use in association with the signal-transmitting mechanism of this invention is described in my application, filed March 19, 1904, Serial No. 198,952.

The telephone outfit at the substation comprises, as usual, two bridges 19 and 20 between conductors 12 and 13, the former bridge containing a condenser and bell and the latter bridge containing a telephone receiver, transmitter, and hook-switch.

In the normal operation of the telephone the same current passing in opposite directions over conductors 12 and 13 and through the two windings of the differential relay DR produces no effect upon said relay, the magnetizing effect of one coil neutralizing that of the other. Consequently the armature of said relay will not be attracted and the circuit to the protection office by conductors 17 and 18 will remain open at the armature-contacts. Upon establishment, however, of a grounded circuit of battery 8 through conductor 13 current will pass through but one winding of the differential relay and its armature will be attracted to close the local circuit to the signal-receiving mechanism. This grounded connection may be established at the protected structure at regular intervals over the following path, to wit: from conductor 13 by conductor 19 to PB', conductor 20, fuse F, conductor 21, PC', conductor 22, one winding 23 of electromagnet M, conductor 24, PC², conductor 25, PS', switch-blade 1, PS⁶, conductor 26, PC³, conductor 27, springs 27 and 28, conductor 29, springs 30 and 31, conductor 32, PC⁴, conductor 33, coil 34 of magnet M, conductor 35, PC⁵, conductor 36, PB², conductor 37 to ground G. This circuit is closed (assuming the switch to be thrown to "protection") only when spring 28 is forced into contact with spring 27 by the action of one of the teeth on a rotary disk 38 and the spring 31 simultaneously forced into contact with the spring 30 by one of the two teeth 39 of a rotary drum 40 (see Fig. 6) shown diagrammatically developed in Fig. 1. The disk 38 and drum 40 are given different circumferential speed or speeds of rotation, the former rotating, say, once a minute and the latter, say, once in four minutes.

Signals sent by the grounded path above outlined are preferably each composed of a series of impulses producing simultaneous effects, as the flashing of an incandescent lamp at the central protection office. As shown, the disk 38 has six groups of six teeth each, and it is intended that each of the teeth 39 shall be of such length as to close the contact between springs 30 and 31 while one of these groups of six teeth is acting to successively open and close the contact between springs 27 and 28. Under normal conditions, therefore, the rotation of the disk and drum will send a signal to the protection office by grounding the circuit at the protected structure every four minutes, the signal sent to the protection office being composed of six impulses, producing corresponding flashing of the indicating-light.

Failure of the transmitting apparatus to send regular signals at the proper intervals will be noticed by the protection-office operator. Likewise the arrival of signals at abnormal frequency will also be observed by him. The sending of such abnormally-frequent signals is provided for by the following connections: The conductor 29, connected to spring 30, is also connected to springs 41, 43, and 45 of three pairs of springs 41 42, 43 44, 45 46. Eight teeth 47 on drum 40 are adapted to successively press spring 42 into contact with spring 41. Likewise eight teeth 48 on the drum are adapted to act successively upon spring 44 to press it into contact with spring 43, and eight teeth 49 on the same drum act to successively press spring 46 into contact with spring 45. From spring 42 a circuit is made as follows: spring 42, conductor 50, PC$^6$, conductor 53, PS$^8$, switch-blade 3, PS$^3$, push-button BA, conductor 56, armature-contacts of relay AR, conductor 57, PS$^2$, switch-blade 2, PS$^7$, conductor 58, PC$^4$, conductor 33, winding of magnet 34, conductor 35, PC$^5$, conductor 36, PB$^2$, and conductor 37 to ground G. From spring 44 a circuit is made as follows: conductor 51, PC$^7$, conductor 54, PS$^9$, switch-blade 4, PS$^4$, push-button BW, conductor 59, armature-contacts of relay FWR, conductor 60, conductor 57, and thence leads to ground over the path just described. Likewise from spring 46 a circuit is made as follows: conductor 52, PC$^8$, conductor 55, PS$^{10}$, switch-blade 5, PS$^5$, push-button BP, conductor 61, armature-contacts of relay FR, conductor 62, conductor 57, and by the latter to ground. These circuits from springs 42 44 46 to ground are, however, normally open at the armature-contacts, so that in the normal operation of the system no current impulses pass over any one of these paths. In case, however, of disturbance in the protection-circuits of any one of the three relays it operates to close its armature-contacts, thus completing the corresponding path to ground. The effect is to send abnormally-frequent signals to the protection-office. By giving different lengths to the teeth 47 48 49 of the drum different characters of signals are transmitted, whereby the protection-office operator is advised of the nature of the disturbance—that is to say, whether it is such as to cause the relay AR, the relay FWR, or the relay FR to close its armature-contacts. There being two of the teeth 39 for effecting the sending of signal once every four minutes during the normal operation of the system and eight equidistant teeth in each of the three series of teeth 47 48 49, the teeth of any one of these series will close its corresponding spring-contacts once every minute. It is preferred to make each tooth 47 of such length as to hold its spring-contacts closed while two groups of the teeth on disk 38 act upon springs 27 and 28, each tooth 48 of such length as to hold its corresponding spring-contacts closed while three of the groups of teeth on disk 38 are in action, and each tooth 49 of such length as to hold its spring-contacts closed while four of the groups of teeth on the disk 38 are in action. The result is that in case the contacts of relay AR are closed a signal composed of twelve impulses corresponding to two groups of teeth on disk 38 will be transmitted once every minute. In case armature-contacts of relay FWR are closed a signal composed of three groups of eighteen impulses corresponding to three groups of teeth on the disk will be transmitted once each minute, and, finally, in case the armature-contacts of relay FR are closed a signal composed of twenty-four impulses corresponding to four groups of teeth on the disk will be transmitted once each minute. By noting the difference in numbers of impulses per minute the protection office operator will be informed as to the nature of the disturbance.

Of course any desired arrangement of teeth on the disk 38 and on the drum 40 may be adopted, with corresponding effect in the signals transmitted.

Any suitable motor may be employed for rotating the disk 38 and drum 40. It is preferred, however, to employ a spring-motor (ordinary clockworks, for example) automatically wound by the action of electromagnet M, the latter being so adjusted as to attract its armature 60 for each make of the circuit carrying the entire current of battery 8 through both of its coils 23 and 34. 63 is the main shaft of the spring-motor, on which a ratchet-wheel 65 loosely turns. The motor-spring 64 (shown in dotted lines Fig. 1) is secured at one end to the shaft and at its other end to the ratchet-wheel, so that movement of the latter in the direction of the arrow winds the spring. A gear-wheel on shaft 63 meshes with a pinion 66 on shaft 67, which latter carries the drum 40. Gear-wheel 68 meshes with pinion 69 on shaft 70, to which disk 38 is secured. The shaft 70 (corresponding to the second-hand shaft of clockworks) is geared to the escapement and hair-spring mechanism in the usual manner.

In connection with the automatic winding of the motor by the magnet M means are provided for automatically preventing excessive winding and consequent injury to the mechanism. Means are also provided for automatically winding the motor immediately upon the throwing of the switch CS to its protection position and whatever the position of the disk and drum-teeth relative to their contact-springs. The motor mechanism may have stopped, for example, with the normal signal-circuit open at springs 27 and 28. This winding is necessary, for the reason that the motor will run down when the switch is left in position to disconnect the transmitting mechanism from the line to the protection-office.

The means just referred to comprise the following mechanism and circuit connections: A contact-arm 71 projects from a disk fast on shaft 63 to a position between two contact-pins 72 and 73. A spring-wing 74 projects from the rear of arm 71 and a hook-arm 75 from its front. (See Figs. 1, 3, and 10.) The hook opens downwardly and has an inclined surface or barb of insulation 76 in advance of the hook-opening. This hook is adapted to conductively engage the projecting end 77 of a coiled spring on pin 73, as presently described. Pin 72 is electrically connected with a conducting-ring 78 and pin 73 with a conducting-ring 79, both rings being on the under side of ratchet-wheel 65 and insulated from it and also from each other by a ring of insulation 80. A brush 82 bears against ring 79, and from said brush a conductor 83 leads through a resistance R to point 84 on conductor 35. A brush 81 bears against ring 79, and a circuit leads to conductor 85, contacts 86 and 87 of dash-pot DP, conductor 88, and PC³. The dash-pot DP is preferably of the well-known liquid type, the piston $p$ being fixed and the cylinder $c$ movable. One contact 86 is carried by a yoke $y$, secured to the cylinder $c$ with interposed insulation, and the second contact is carried by but insulated from the rod of piston $p$. This dash-pot is disposed in such relation to the armature 60 (or an arm connected therewith, as shown in Figs. 2 and 5 and described later) that as the latter reaches the limit of its active stroke it engages and moves the cylinder, thereby separating contacts 86 and 87. When the pressure of the armature is released, gravity acts upon the dash-pot to again bring the contacts 86 and 87 into engagement. Conductor 90 leads from electrical connection with shaft 63, and consequently with arm 71 to PC⁴.

The operation of the means for winding the motor when the switch is thrown on protection is as follows: Assuming the mechanism to have stopped in position to leave the previously-traced circuit through both coils of magnet M open either at springs 27 28 or 30 31, it is apparent that the armature 60 will remain inert; but since the running down of the motor has caused hook 75 to engage the spring 77 on pin 73 a circuit through both coils of magnet M is established over the following path: ground G' at central office, conductor 7, battery 8, conductors 10, 13, and 19, PB', fuse F, conductor 21, PC', conductor 22, winding 23, conductor 24, PC², conductor 25, PS', blade 1, PS⁶, conductor 26, PC³, conductor 88, contacts 87 86, conductor 85, brush 81, ring 79, pin 73, spring 77, hook 75, arm 71, conductor 90, PC⁴, conductor 33, coil 34, conductor 35, PC⁵, conductor 36, PB², and conductor 37 to ground G. This circuit will be repeatedly made and broken at contacts 86 and 87 by the coöperation of the armature and dash-pot until the spring 77 is disengaged from hook 75, breaking the circuit at this point. The electrical connection through the hook and spring will be prolonged by the yielding of the latter until the end of the spring finally snaps out of the hook. This affords time to sufficiently wind the motor before the circuit is broken at this point. On the other hand, the electrical engagement of the spring and hook is delayed for the reason that the former is first engaged by the insulation 76 and yields until its end finally drops into the hook-opening, thus permitting arm 71 to approach quite close to pin 73 before electrical contact is established.

The operation is practically the same if the teeth are in position to force the springs 27, 28, and 30 and 31 into contact. This simply provides a second path between PC³ and PC⁴ by way of conductor 27, springs 27 38, conductor 29, springs 30 and 31, and conductor 32. The current will therefore divide at PC³, uniting again at PC⁴ and passing full force by conductor 33 to coil 34.

The operation of the means for preventing overwinding of the motor is as follows: The intermittent operation of the magnet M by the regular signal impulses (showing no disturbance at the protected structure and that the system is connected in operation) will rotate the ratchet-wheel 65 and advance the pins 72 and 73 in such manner that there will be no electrical connection between either of said pins and arm 71. In case, however, the signal impulses are of such frequency as to cause pin 72 to overtake arm 71 a shunt will be established around the magnet-coil 34 between PC⁴ and conductor 35 by the following path: PC⁴, conductor 90, arm 71, spring 74, pin 72, ring 78, brush 82, conductor 83, resistance R, to point 84 on conductor 35. A material portion of the current will under these conditions divide at PC⁴ and pass over this shunt-path. As we have already seen, the full force of current must pass through both coils of magnet M to attract armature 60. It follows that with this shunt established only a part of the current will traverse coil 34 and the armature will not be attracted. With an unobstructed shunt practically none of the current would pass through winding 34; but the absence of any resistance in the shunt might permit an increased flow of current through coil 23 sufficient to so augment the magnetic power thereof as to attract the armature. To avoid this and maintain the proper balancing of the circuit when the shunt is established, I prefer to insert a suitable resistance R in the circuit.

By connecting coil 23 in the circuit from main-line conductor 13 and in advance of the signaling mechanism said coil serves as a choke-coil to lightning discharges and the like, repelling them to ground G by way of conductors 21, lightning-arrester La, conductor 95, $PB^2$, and conductor 37. Fuse F serves the usual function of protecting the mechanism from excessive currents.

Referring now to the local protection-circuits leading through the relays at the protected structure and shown at the left of line $L^5 L^6$, Fig. 1, $B^2$ is a local battery common to all of the circuits. Conductors 100 and 101 lead from the poles of this battery to $PB^6$ and $PB^3$, respectively. A fire-alarm circuit such as is well known in systems of this character leads from $PB^6$ by conductor 102 (including thermostats) to $PB^4$, conductor 103, coil of relay FR, conductor 104, push-button $BFt$, and conductor 105 to $PB^3$. The current of battery $B^2$ passing over this circuit energizes the relay FR, so that it constantly attracts its armature, thereby normally holding the contacts of the latter open. In case of fire opening this circuit (by fusing a thermostat) the relay-magnet is deënergized and its armature-contacts closed, with the result heretofore described. A burglar-alarm circuit leads from $PB^6$, by conductor 106, through resistance $R^2$, winding of relay AR, conductor 107, winding of relay FWR, conductor 108, push-button $BWt$, conductor 109, $PB^5$, conductor 110, to conductor 105, and $PB^3$. Although the resistance in this circuit permits the passage of current therethrough from battery $B^2$ sufficient to energize the fine-wire relay FWR, causing it to attract its armature and maintain the contacts thereof open, said current is insufficient to energize relay AR to cause it to attract its armature to close its armature-contacts. In case this circuit is broken relay FWR is deënergized and its armature-contacts closed, with the result previously described.

The conductor 111 between the points 112 and 113 on conductor 110 contains a normally open window or door attachment 114 of the type ordinarily employed in such systems. The opening of the door or window closes conductor 111, thereby short-circuiting resistance $R^3$ and permitting current to pass through relay AR sufficient to energize the same and close its relay-contacts with the result previously described. Conductor 111 also contains switch Sa, (see also Fig 2,) which may be opened in case it is at any time desired to open the window or door without sending a signal to the protection office. A normally open push-button $BAt$ is connected in a conductor 115 leading from $PB^5$ to a point 116 on conductor 111.

The functions of the six push-buttons heretofore referred to are as follows: When the switch is thrown to "protection," as shown in Fig. 1, it is desirable for the occupant of the protected structure to test the operativeness of the system to send in signals, as in case of disturbance. This may be done by pressing the push-buttons $BAt$, $BWt$, and $BFt$ in succession, thereby causing the relays AR, FWR, and FR to operate in the same manner as if there had been a fire or disturbance in the burglar-alarm circuit, consequently sending in corresponding signals to the protection-office.

It is also desirable for the occupant of the protected structure before throwing his switch to protection to make a local test for the purpose of ascertaining that the local protection-circuits are in proper condition. In providing for this test a conductor 120 leads from $PB^6$ to three switch-posts $PS^{15}$, $PS^{14}$, and $PS^{13}$, in multiple, and a conductor 121 leads from $PB^3$ through bell or buzzer Bz (shown as a bell in Fig. 1 and as a buzzer in Figs. 2 and 3) and resistance $R^4$ to $PS^{12}$. It follows that when the switch CS is thrown to test position (to the left) a disturbance in either of the protection-circuits causing one of the relays to close its armature-contacts will complete the circuit of battery $B^2$ through the buzzer or bell, causing the latter to sound an alarm. Resistance $R^4$ in this circuit prevents an excess of current of the battery going by this path in preference to the protection-circuits. Assume, for example, that the fire-alarm circuit is open, resulting in the closing of the armature-contacts of relay FR when the switch is thrown to test. Under these conditions the circuit through the buzzer will be as follows: battery $B^2$, conductor 101, $PB^3$, conductor 121, Bz, $R^4$, $PS^{12}$, switch-blade 2, $PS^2$, conductors 57 and 62, armature-contacts FR, conductor 61, button BF, $PS^5$, blade 5, $PS^{15}$, conductor 120, $PB^6$, conductor 100 to the other pole of the battery.

To ascertain the nature of the disturbance, push-buttons BA, BW, and BF are pressed. As pressing of the button BF will open the circuit through the buzzer and silence the latter, the person testing will know at once that the fire-alarm circuit is not in working condition.

In case a window in the burglar-alarm circuit has not been properly closed, closing the burglar-alarm circuit at 114, for example, the current passing over the burglar-alarm circuit will be sufficient to close the armature-contacts to relay AR. As before, this will effect sounding of the buzzer when the switch is thrown to "test," except that in this case the circuit connections from conductor 57 to conductor 120 will lead through the armature-contacts of relay AR, conductor 56, button BA, PS³, blade 3, and PS¹³. Pushing the button BA will silence the buzzer, thus indicating that the burglar-alarm circuit is closed at one of the attachments by failure to shut a door or window. In case the disturbance in the burglar-alarm circuit is such as to open the same, all of the attachments being properly opened by the closing of windows and doors, the normally closed circuit through relay FWR will be broken and the buzzer-circuit closed through the contacts of said armature when the switch is thrown to "test." The circuit through the buzzer is the same as previously described, except that the path from conductor 57 to conductor 120 leads in this instance through conductor 60, armature-contacts of relay FWR, conductor 59, button BW, PS⁴, blade 4, and PS¹⁴. Pressing button BW will open this circuit and silence the buzzer, thus indicating that there is a break in the burglar-alarm circuit.

As clearly shown in Figs. 2, 3, and 4, the magnet M is mounted in such position that its weighted armature drops away from the cores of the magnet when the latter are demagnetized. A plate 130 in front of the magnet supports the motor mechanism and associated parts. The armature is secured by screw 132', Fig. 5, to a rock-shaft which passes through plate 130 and has fixed thereon a two-armed crank 132. The projecting end of the shaft also passes loosely through two lever-arms 133 and 134, which are prevented from slipping off the shaft by a collar 135. A screw 136 passes through arm 133, one arm 137 of the crank 132, and carries a nut 138. In a similar manner screw 140 passes through arm 134 and the other arm, 139, of crank 132 and carries a nut 141. A spring 142 coiled around shaft 131 bears at one end against arm 134 and at its other end against arm 133 and acts to press said arms as far apart as the positions of nuts 138 and 141 will permit. Pawl 143, pivoted to arm 133, is held in engagement with ratchet-wheel by spring 144, and a spring-actuated retaining-pawl 145 (see also Fig. 1) acts to hold said wheel in the position to which it is advanced by the action of pawl 143. As shown in Fig. 2, the dash-pot DP is in position to be acted upon by arm 134 in the manner heretofore described.

To set the arm 133 and ratchet 143 to proper position relative to the ratchet-wheel 65 and armature 60, the latter is pressed against the magnet-poles and the screw 136 turned, thereby adjusting arm 133 around shaft 131 toward or from fixed arm 137. Likewise to set arm 134 to the desired operative position relative to the dash-pot the screw 140 is turned.

As will be understood, the movement of the armature is transmitted to arm 133 through the spring 142 (without overcoming the tension thereof) under normal working conditions. In case, however, the motor-spring is tightly wound or movement of the ratchet-wheel blocked by pin 72 engaging arm 71 movement of the armature will simply compress spring 142 without transmitting movement to arm 133. The yielding connection therefore avoids injury to the mechanism under these conditions.

A bracket 150, secured to a post of the motor mechanism, carries a screw 151, Figs. 2, 3, and 4, the end of which projects into the path of arm 133. Impact of these parts will jar the escapement mechanism into action and assure the starting of the motor as soon as its spring is wound.

The armature connections, spring-motor mechanism, and circuit-controlling pins and arm herein described resemble in their principal features the similar parts shown in my applications Serial Nos. 152,953, filed April 16, 1903, and 198,952, filed March 19, 1904.

As shown in Figs. 2, 3, and 6, the drum 40 is adjustably connected to shaft 67. A screw 160 passes loosely through a slot in a radial arm 161, fast to the end of shaft 67, and engages a screw-threaded opening in an angle-piece 163, secured to the drum. A coiled spring 164 on screw 160 holds the head of the latter tight against the arm 161. By turning the screw the drum may be adjusted about shaft 67 to cause the teeth of the drum to act at the proper time relative to the action of the teeth on disk 38.

As shown in Figs. 2 and 3, the relays AR, FWR, and FR are of the well-known iron-clad type in common use in telephone systems.

It is obvious that many modifications may be made in arrangement of the circuits and apparatus, &c., without departing from the spirit of the invention.

What I claim is—

1. The combination with a metallic telephone-circuit containing a generator permanently grounded at one pole and a differentially-wound relay, of a mechanism actuated by two or more local protective circuits, to automatically establish a grounded circuit from the generator through one coil of the differential relay, to give a distinguishing-signal indicating which alarm-circuit is actuating the mechanism, without interfering with the operation of the telephone-circuit.

2. The combination with a metallic telephone-circuit containing a generator permanently grounded at one pole, and a differentially-wound relay, of a mechanism actuated by one or more local protective circuits and also by a periodic circuit-closing device, to automatically establish a grounded circuit from the generator through one coil of the differential relay to give a distinguishing-signal indicating the protected circuit or periodic-closing device which is actuating the mechanism, without interfering with the operation of the telephone-circuit.

3. The combination with a main circuit leading through a pair of normally open contacts and from said contacts by two paths in multiple, a pair of contacts in each path, actuating means for intermittently closing said three pairs of contacts, a protection or analogous circuit, and a fourth pair of normally open contacts in one of said paths adapted to be closed by disturbance in said protection-circuit.

4. The combination with a main circuit leading through a pair of normally open contacts and from said contacts by two paths in multiple, a pair of contacts in each path, actuating means for intermittently closing said three pairs of contacts, protective wiring, two other pairs of normally open contacts in said paths respectively adapted to be closed by disturbance in said wiring.

5. The combination with a main circuit leading through a pair of normally open contacts and from said contacts by three or more paths in mutiple, a pair of contacts in each of said paths, actuating means for intermittently closing said four or more pairs of contacts, protection or analogous circuits, and other pairs of contacts one in each of two of said multiple paths adapted to be closed by disturbance in said protection-circuits respectively.

6. The combination with a main circuit leading through a first pair of normally open contacts, and from said contacts by three or more paths in multiple, actuating means for intermittently closing said contacts, other pairs of contacts one in each of said paths, and actuating means for intermittently closing the same and for holding them closed for periods of time differing for the several paths while the circuit is closed and opened at the first pair of contacts, and a protection or analogous circuit or circuits controlling the continuity of said paths.

7. The combination with a main circuit leading through a first pair of normally open contacts and from said contacts by three or more paths in multiple, actuating means for intermittently closing said contacts, a pair of contacts in one path adapted to be intermittently closed to complete the circuit for the sending of normal working signals thereover, and other pairs of contacts one in each of the other paths, a protection or analogous circuit or circuits controlling the continuity of said other paths, and actuating means for intermittently closing the contacts in the multiple paths for periods of time differing for the several paths and while the circuit is closed and opened at the first pair of contacts.

8. In a system of the character described, a main circuit leading through a first pair of normally open contacts and from said contacts by two or more paths in multiple, a rotatable disk having actuating-teeth for closing said contacts, other pairs of contacts one in each of said paths, a rotatable drum having teeth thereon for intermittently closing said other pairs of contacts, a protection or analogous circuit associated with and controlling the continuity of one of said paths, and motor mechanism for continuously rotating the disk and drum.

9. In a system of the character described, a main circuit leading through a first pair of contacts and from the latter by a plurality of paths in multiple, a rotatable disk having teeth for intermittently closing a second pair of contacts in one of said paths which is otherwise complete and over which normal working signals are sent, other pairs of contacts one in each of the other paths, a protection or analogous circuit or circuits also controlling the continuity of said other paths, a rotatable drum having teeth for intermittently closing the several paths at the pairs of contacts, and motor mechanism for continuously rotating the disk and drum.

10. In a system of the character described, a main circuit leading through a first pair of contacts and from the latter by a plurality of paths in multiple, a rotatable disk having teeth for intermittently closing a second pair of contacts in one of said paths which is otherwise complete and over which normal working signals are sent, other pairs of contacts one in each of the other paths, a protection or analogous circuit or circuits also controlling the continuity of said other paths, a rotatable drum having teeth for intermittently closing the several paths at the pairs of contacts, and motor mechanism for continuously rotating the disk and drum, the former at greater speed than the latter.

11. In a system of the character described, a main circuit leading through a first pair of contacts and from the latter by a plurality of paths in multiple, a rotatable disk having teeth for intermittently closing a second pair of contacts in one of said paths which is otherwise complete and over which normal working signals are sent, other pairs of contacts one in each of the other paths, a protection circuit or circuits also controlling the continuity of said other paths, a rotatable drum having rows of equidistant teeth for intermittently closing the pair of contacts in the several paths respectively.

12. In a system of the character described, a main circuit leading through a first pair of contacts and from the latter by a plurality of paths in multiple, a rotatable disk having teeth for intermittently closing a second pair of contacts in one of said paths which is otherwise complete and over which normal working signals are sent, other pairs of contacts one in each of the other paths, a protection or analogous circuit or circuits also controlling the continuity of said other paths, a rotatable drum having rows of equidistant teeth for intermittently closing the pair of contacts in the several paths, respectively, the teeth in each row differing in length from those in the other rows.

13. The combination with a main circuit, of transmitting means for intermittently sending over said circuit normal working electrical signal impulses or alarm-signal impulses of greater frequency, said means comprising actuating motor mechanism, a motor-winding magnet in the main circuit adapted to be actuated by the entire current traversing its complete winding, and automatically-operating means acting upon the winding of the motor mechanism to a predetermined extent to divert part of the current from a portion of the winding of the magnet thereby weakening the latter and preventing it from further winding the motor.

14. The combination with a main circuit, of transmitting means for intermittently sending over said circuit normal working electrical signal impulses or alarm-signal impulses of greater frequency, said means comprising actuating motor mechanism, a motor-winding magnet in the main circuit adapted to be actuated by the entire current traversing its complete winding, and automatically-operating means acting upon the winding of the motor mechanism to a predetermined extent to establish a shunt around a portion of the winding of the magnet thereby preventing the latter from further winding the motor.

15. The combination with a main circuit, of transmitting means for intermittently sending over said circuit normal working electrical signal impulses or alarm-signal impulses of greater frequency, said means comprising actuating motor mechanism, a motor-winding magnet in the main circuit adapted to be actuated by electrical impulses traversing said main circuit, contacts in said circuit beyond the magnet, means actuated by the motor mechanism for intermittently closing said contacts, and a shunt automatically established around said contacts when the motor mechanism is run down.

16. The combination with a main circuit, of transmitting means for intermittently sending over said circuit normal working electrical signal impulses or alarm-signal impulses of greater frequency, said means comprising actuating motor mechanism, a motor-winding magnet in the main circuit adapted to be actuated by electrical impulses traversing said main circuit, contacts in said circuit beyond the magnet, means actuated by the motor mechanism for intermittently closing said contacts, a shunt automatically established around said contacts when the motor mechanism is run down, and means actuated by each operation of the electromagnet for breaking said shunt.

17. The combination with a main circuit and transmitting means for sending over said line normal working electrical signal impulses, or greater-frequency alarm-signal impulses, said means comprising normally open contacts in said circuit, rotatable means for intermittently closing said contacts, and a motor for continuously driving the same, of a motor-winding magnet, automatically-operating means for establishing a short circuit around a part of the magnet-winding when the motor is wound to a predetermined extent thereby preventing further winding; and automatically-operating means for establishing a short circuit around said contacts when the motor is run down and for intermittently breaking said short circuit on each actuating stroke of the magnet.

18. The combination with a main circuit and transmitting means for sending over said circuit normal working electrical signal impulses or greater-frequency alarm-signal impulses, said means comprising normally open contacts in said circuit, rotatable means for intermittently closing said contacts, and a motor for continuously driving the same; of a motor-winding magnet having its winding in said main circuit, a terminal arm rotated by the motor, two terminal contacts on opposite sides of said terminal arm intermittently rotated by the motor-winding magnet, a shunt around part of the magnet-winding closed by engagement of said terminal arm and one terminal contact, and a shunt around the main-circuit contacts closed by engagement of the terminal arm and the other terminal contact; and means for breaking the latter shunt on each working stroke of the winding-magnet.

19. The combination with a main circuit, of electrical signal-transmitting means associated therewith and comprising contacts, means for intermittently closing the same, an actuating-motor, and a motor-winding electromagnet having a coil in the main circuit one on each side of the contacts, and a lightning-arrester in a ground connection from the main line in advance of said coils.

20. The combination with two or more protection or analogous circuit-relays, of a main signaling-circuit having two or more multiple-arc paths each containing in series a switch, a normally closed push-button and normally open relay-contacts of one of said relays; and a local test-circuit containing a generator and a signal device and leading through said switches, push-buttons and relay-contacts disposed in multiple arc when the switches are thrown to local test position.

21. The combination with two protection-circuit relays, and a protection-circuit leading through magnets of the same, of a main circuit normally open at contacts of said relays, and push-buttons or analogous devices in said protection-circuit for manually effecting the operation of said relays to close their contacts respectively for test purposes.

22. The combination with two or more protection-circuits, of relays having magnet-coils in said circuits, a main circuit having multiple-arc paths leading through normally open contacts of said relays respectively, and push-buttons or analogous devices in said protection-circuits for manually effecting the operation of said relays respectively for test purposes.

23. The combination with two or more protection-circuits, of relays having magnet-coils in said circuits, a main circuit having multiple-arc paths each containing in series a switch, a normally closed push-button, and normally open relay-contacts of one of said relays; and a local test-circuit containing a signal device and leading in multiple arc through said switches, push-buttons and relay-contacts when the switches are thrown to local test position; and other push-buttons or analogous devices in said protection-circuits for manually effecting the operation of said relays to close their contacts respectively.

24. Circuit making and breaking mechanism comprising a circuit-terminal arm having a hook thereon with an insulated barb, a motor for rotating said arm, a circuit-terminal pin, a spring on said pin the free end of which projects into the path of and is adapted to be electrically engaged by the hook when the arm moves toward and faster than the pin, and means for advancing the pin.

25. The combination with an electric circuit, of a motor, a terminal arm rotated by the motor, and having a hook thereon with an insulated barb, a circuit-terminal pin, a spring on said pin the free end of which projects into the path of and is adapted to be electrically engaged by the hook when the arm moves toward and faster than the pin, an electromagnet in said circuit acting to wind the motor and rotate said terminal pin, and a short circuit through said magnet closed by electrical engagement of the hook and spring.

26. The combination with two or more protection or analogous circuit relays, of a main signaling-circuit having two or more multiple-arc paths each containing in series a switch, a normally closed push-button and normally open relay-contacts of one of said relays; a local test-circuit containing a generator and a signal device and leading in series through said multiple-arc paths containing the switches, push-buttons and relay-contacts, when the switches are thrown to local test position, and an operating handle or device common to all of the switches adapted to simultaneously throw all of them to one position to establish the multiple paths of the main circuit therethrough and thereby open the multiple paths of the local circuit at said switches, or adapted to simultaneously throw all of the switches to another position to establish the multiple paths of the local circuit therethrough and thereby open the multiple paths of the main circuit at said switches.

27. The combination with two or more protection or analogous circuit relays, of a main signaling-circuit having two or more multiple-arc paths each containing in series a switch, a normally closed push-button and normally open relay-contacts of one of said relays; another switch through which the main circuit leads from its multiple-arc paths, a normally open local test-circuit containing a generator and a signal device and leading from one pole of the generator to terminals of said first-stated switches and from its other pole to terminals of said last-stated switch, and an operating handle or device common to all of the switches adapted to simultaneously throw all of them to one position to establish the multiple paths of the main circuit therethrough and thereby open the multiple paths of the local circuit at said switches, or adapted to simultaneously throw all of the switches to another position to establish the multiple paths of the local circuit therethrough and thereby open the multiple paths of the main circuit at said switches.

28. The combination with a metallic circuit normally used for another purpose and containing a generator permanently grounded at one pole, of signal-transmitting mechanism connected to a local circuit to automatically and intermittently ground the conductor of said metallic circuit so as to send normal working electrical signals over the main line when the local circuit is in normal working condition, and to send distinctive electrical alarm-signals over said main line in case of disturbance in said local circuit, all without interfering with the operation of said metallic circuit for its primary purpose.

In testimony whereof I have signed this specification in the presence of two subscribing witnesses.

FRANKLIN S. HOLMES.

Witnesses:
G. M. LOCKWOOD,
THOMAS C. BEHAN.